UNITED STATES PATENT OFFICE.

R. L. DELISSER, OF NEW YORK, N. Y., ASSIGNEE OF DR. ALOYSE CHEVALIER AUER DE WELSBACH.

IMPROVEMENT IN THE MANUFACTURE OF PAPER.

Specification forming part of Letters Patent No. 38,220, dated April 21, 1863; antedated November 23, 1861; Reissue No. 2,365, dated September 25, 1866.

*To all whom it may concern:*

Be it known that ALOYSE CHEVALIER AUER DE WELSBACH, of the city of Vienna, in the Empire of Austria, has invented a new and useful process of obtaining and preparing from the husks, leaves, and stalks of the plant called "maize" or "Indian corn" a textile material suitable for spinning, weaving, and other useful purposes, of which the following is a specification.

The nature of this invention consists in treating the above-named plant or the parts thereof with alkaline solutions, in combination with a hatcheling operation, whereby a textile material suitable for weaving and other useful purposes is obtained.

The leaves which envelop the ears of the plant known as maize or Indian-corn, or the leaves and stalks of the said plant, are put separately into a boiler, kettle, or other suitable vessel, together with a solution of soda or other suitable alkaline salts, the quantity of which is to be varied according to the quality that it may be desired to impart to the textile material, and the whole exposed to the action of hot or boiling water for several hours.

This invention is not confined to the use of any exact degree of strength in the alkaline solution; but it is found that a good and suitable solution may be prepared by mixing fifty pounds of soda with water enough to cover two thousand pounds of straw. By this process the fibrous or textile material contained in the plant separates itself from the other constituents of the plant and settles on the bottom of the vessel, while the lighter parts continue to float on the surface of the liquid, so that when the same is poured out the textile material alone remains in the boiler.

After being dried the textile material is hatcheled in the same way as the fibers of flax and hemp, after which it is to be spun and woven by hand or machine in the ordinary manner into fabrics of various kinds.

The refuse or scraps of the weaving material, as well as the whole of the textile material or fiber, may be used for making paper; and the flour dough, which is separated from the fibers during the process, may be used for bread, spirituous liquors, and other useful things.

It is acknowledged that prior to this invention straw and various other vegetable substances have been subjected to the chemical action of a heated solution of soda and lime in water, for the purpose of dissolving the proximates of the plant and obtaining the fibrous matter in a suitable condition to be reduced in the usual way to pulp suitable for making paper; and it is also acknowledged that paper has been made from such vegetable substances.

It is not, therefore, claimed, broadly and separately—*i. e.*, the treatment of the leaves, husks, and stalks of corn, or either, in heated alkaline solutions.

Corn husks and leaves have too great a value in the market to admit of using them, as heretofore attempted, in the manufacture of paper. It is discovered, however, that the leaves, husks, and stalks of Indian corn, when properly treated, as hereinabove described, will produce fibers suitable to be spun into good thread, which, when woven, will make good cloth, while the refuse can be made into pulp suitable for making paper, and the other ingredients of the plant dissolved by the alkaline solution may be used for other purposes.

It is obvious, however, that, if desired, the fibers which have been obtained by this process in a suitable condition for being spun into threads may, by proper means, be reduced to a pulp suitable for making paper, as the fibers of flax and hemp have heretofore been reduced to pulp.

What is claimed as new in this invention, and as a means of obtaining from the husks, leaves, and stalks of Indian-corn fibers in a suitable condition to be spun into thread, is—

The treatment of such material in a heated alkaline solution, substantially as described, to dissolve and separate the proximates of the plant from the fibers, in combination with the after process of hatcheling, or the equivalent thereof, to get the fibers in a suitable condition for spinning, substantially as described.

R. L. DELISSER.

Witnesses:
PETER COOKE,
C. L. TOPLIFF.